US011772678B2

(12) United States Patent
Peters et al.

(10) Patent No.: US 11,772,678 B2
(45) Date of Patent: Oct. 3, 2023

(54) METHOD FOR OUTPUTTING RECOMMENDATIONS FOR ENERGY EFFICIENT OPERATION OF A VEHICLE USING AN ASSISTANCE SYSTEM COMPRISED BY THE VEHICLE

(71) Applicant: MERCEDES-BENZ GROUP AG, Stuttgart (DE)

(72) Inventors: Steven Peters, Schwieberdingen (DE); Reiner Paetzold, Göppingen (DE); Teresa Botschen, Althengstett (DE); Alexander Schmitt, Sindelfingen (DE); Frank Nebel, Stuttgart (DE); Stefan Ultes, Walsdorf (DE); Wolfgang Maier, Tübingen (DE); Ingo Kreuz, Aidlingen-Dachtel (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/920,431

(22) PCT Filed: Apr. 14, 2021

(86) PCT No.: PCT/EP2021/059627
§ 371 (c)(1),
(2) Date: Oct. 21, 2022

(87) PCT Pub. No.: WO2021/213855
PCT Pub. Date: Oct. 28, 2021

(65) Prior Publication Data
US 2023/0124291 A1   Apr. 20, 2023

(30) Foreign Application Priority Data

Apr. 22, 2020 (DE) .................... 10 2020 110 866.4

(51) Int. Cl.
*B60W 50/16* (2020.01)
*B60W 50/08* (2020.01)
*B60W 50/14* (2020.01)

(52) U.S. Cl.
CPC .......... *B60W 50/16* (2013.01); *B60W 50/082* (2013.01); *B60W 2050/143* (2013.01); *B60W 2050/146* (2013.01); *B60W 2540/30* (2013.01)

(58) Field of Classification Search
CPC ...... B60W 10/06; B60W 10/10; B60W 10/30; B60R 16/02; B60R 16/023; B60R 25/24; G06F 8/654; G06F 11/3058
See application file for complete search history.

(56) References Cited

U.S. PATENT DOCUMENTS 7,127,337 B2 * 10/2006 Bennett ................. B60W 10/06
701/22
7,653,474 B2 * 1/2010 Cawthorne ........... B60W 20/10
701/99

(Continued)

FOREIGN PATENT DOCUMENTS

CN   101687481 A   3/2010
CN   109204300 A   1/2019

(Continued)

OTHER PUBLICATIONS

International Search Report and Written Opinion dated Jul. 21, 2021 in related/corresponding International Application No. PCT/EP2021/059627.

(Continued)

*Primary Examiner* — Rachid Bendidi
*Assistant Examiner* — Andrew J Cromer
(74) *Attorney, Agent, or Firm* — PATENT PORTFOLIO BUILDERS PLLC (57) ABSTRACT

A method for outputting recommendations for energy efficient operation of a vehicle having at least two modes of (Continued)

operation, from which an operating mode is respectively selected by a drive controller, depending on the occurrence of specified triggers, for operating the vehicle. A change of operating mode caused by the trigger is determined. A frequency of the change of operating mode is incremented at every determination of the change of operating mode caused by the trigger. The frequency is analyzed by comparing the frequency of the change of operating mode a predetermined value. A message is generated on a case-by-case basis. The message is output via at least one output comprised by the vehicle.

9 Claims, 3 Drawing Sheets (56) References Cited

U.S. PATENT DOCUMENTS

| | | | |
|---|---|---|---|
| 8,335,639 B2 | 12/2012 | Bruns et al. | |
| 8,423,214 B2* | 4/2013 | Kshatriya | B60K 6/485 |
| | | | 180/65.21 |
| 8,606,443 B2* | 12/2013 | Pandit | B60W 20/00 |
| | | | 180/65.21 |
| 8,788,113 B2 | 7/2014 | Filev et al. | |
| 8,862,376 B2* | 10/2014 | Yabuta | B60W 50/14 |
| | | | 701/123 |
| 9,102,320 B2* | 8/2015 | McGee | F02D 41/029 |
| 9,678,495 B2* | 6/2017 | Fushiki | G05B 19/042 |
| 9,884,615 B2* | 2/2018 | Pandit | B60W 20/11 |
| 11,027,745 B2 | 6/2021 | Hipp | |
| 11,433,871 B2* | 9/2022 | Furuya | B60W 10/08 |
| 2010/0178637 A1 | 7/2010 | Lecointre et al. | |
| 2010/0204863 A1* | 8/2010 | Sakamoto | B60W 10/26 |
| | | | 180/65.285 |
| 2012/0098497 A1* | 4/2012 | Ogane | B60W 20/13 |
| | | | 320/134 |
| 2012/0266108 A1 | 10/2012 | Lien et al. | |
| 2012/0316699 A1* | 12/2012 | Filev | B60W 40/09 |
| | | | 701/1 |
| 2016/0272220 A1* | 9/2016 | Ichikawa | B60W 20/10 |

FOREIGN PATENT DOCUMENTS

| | | |
|---|---|---|
| DE | 102008038446 B3 | 2/2010 |
| DE | 102012209518 A1 | 12/2012 |
| DE | 102014214559 A1 | 1/2016 |
| DE | 102014115582 A1 | 4/2016 |
| DE | 102019001445 A1 | 9/2019 |
| EP | 1589211 A1 | 10/2005 |
| EP | 3412534 A1 | 12/2018 |

OTHER PUBLICATIONS

Office Action dated Apr. 12, 2023 in related/corresponding CN Application No. 202180030325.2.

* cited by examiner

METHOD FOR OUTPUTTING RECOMMENDATIONS FOR ENERGY EFFICIENT OPERATION OF A VEHICLE USING AN ASSISTANCE SYSTEM COMPRISED BY THE VEHICLE

BACKGROUND AND SUMMARY OF THE INVENTION

Exemplary embodiments of the invention relate to a method for outputting recommendations for energy efficient operation of a vehicle, to an assistance system, as well as to a vehicle with such an assistance system.

Assistance systems and methods for outputting information with the help of a driver assistance system that is comprised by a vehicle are generally known from the prior art. The scope of information output by such a system ranges from convenience functions, such as outputting route information in a navigation system or restaurant recommendations, to status information about the vehicle, for example an explanation of why an automatic stop/start system is not active, to outputting warnings to increase driving safety, for example outputting a distance collision warning.

Nowadays, due to global warming and the scarcity of natural resources, it is increasingly important to live sustainably. To this end, proactive driving is already being taught in driving schools, whereby fuel consumption can generally be reduced during operation of a vehicle. However, over time, every driver develops an individual driving style, which, in the case of a sporty or a heavy-handed way of driving, is, however, associated with increased fuel consumption. This necessitates educating experienced drivers in an intentional way of driving, in order to unlearn behavioral patterns that are damaging to the environment.

A significant tool for reducing greenhouse gases is also being seen in the electrification of mobility. However, for energy efficient travel in an electric vehicle or a hybrid vehicle, other requirements are placed on the controlling of such a vehicle in comparison to a classic internal combustion engine. A driver sometimes lacks knowledge as to in which driving situations an electric motor offers benefits compared to an internal combustion engine, how the electric motor and the internal combustion engine work together in a hybrid vehicle, or how a vehicle can be driven in an especially energy efficient way.

DE 10 2019 001 445 A1 discloses an information system of a vehicle, a vehicle, as well as a method for informing passengers of a vehicle. Thereby, the vehicle comprises a planning unit for making decisions for the autonomous control of the vehicle. The planning unit outputs reasons for selecting the decisions made for controlling the vehicle in a human-readable form by means of an information output module. Thus, the acceptance of autonomously driving vehicles is increased and the need for manual interventions for controlling the vehicle by a driver is reduced. However, the patent specification thus does not provide any indication of educating a driver in a more intentional way of driving.

The present invention is based on the task of getting a driver to have a more intentional way of driving, with the help of an assistance system comprised by the vehicle.

According to the invention, this task is solved by a method for outputting recommendations for energy efficient operation of a vehicle, an assistance system, as well as a vehicle with such an assistance system.

A method for outputting recommendations for energy efficient operation of a vehicle, wherein the vehicle has at least two operating modes, from which an operating mode is respectively selected by a drive controller, depending on the occurrence of specified triggers, for operating the vehicle, comprises the following method steps according to the invention:

monitoring driving conditions with sensors comprised by the vehicle;

determining a change of operating mode caused by a trigger brought about by driving conditions or driving behavior of a driver, counting up a frequency of the change of operating mode at every determination of the change of operating mode caused by the trigger, analysis of the frequency; wherein the frequency of the change of operating mode is compared with a predetermined value; and on a case-by-case basis and depending on the result of the comparison, a message about the change of operating mode is generated, and the message is output via at least one means of output comprised by the vehicle.

With the help of the method, a driver can be educated in an intentional way of driving. The vehicle can, for example, comprise the following operating modes: cruising, recuperation, turning off a motor with a stop/start system, load point shifting, battery charging, boosting, etc. The message about the change of operating mode is therefore to be understood as a message of a category of a previously named exemplary change of operating mode. During the operation of the vehicle, sensors monitor current and/or future driving conditions. To this end is recognized, for example, a distance between the vehicle and objects or vehicles driving ahead of the vehicle, a vehicle speed or the pressure exerted on a gas and/or brake pedal by the driver. Generally, the vehicle comprises a plurality of sensors, which monitor further features. A detailed counting up is avoided at this stage, since it is not necessary for the execution of the invention. A plurality of triggers are defined for a vehicle, which are recognized by exceeding or falling short of pre-programmed trigger values measured by sensors. In this case, it is for example a distance warning, an accelerator pedal position, a brake pedal position, an external temperature or similar. The triggers are to be understood as events or conditions that characterize a change of the driving conditions and cause a change of operating mode. The triggers that are to be understood as events relate, in the present context, to driving conditions or changes in the driving conditions that are recognized by attaining predetermined trigger values. A trigger can also suppress a change of operating mode, for example because an event such as a case of a cleaning process runs an exhaust filter. The trigger values are to be understood as thresholds of sensor signals, at the exceeding or falling short of which a change of operating mode is caused. Therefore, a hysteresis can be planned for the trigger values, i.e., for example when a first trigger value is reached, there is a change from a first to a second operating mode, the change back from the second to the first operating mode occurs at a second trigger value, whose value is lower than that of the first trigger value. For every potential trigger or every potential combination of triggers, the vehicle comprises a fixed allocation, where the operating mode is selected depending on the trigger, i.e., which active operating mode ends and which new operating mode is activated. The way of driving with which the vehicle is controlled can be characterized by counting up a frequency of the change of operating mode that is associated with the trigger that is responsible for the change of operating mode. The way of driving is, for example, analyzed by a program referred to as Eco-Coach, whereby a best suited, personalized individual recommendation for adapting the driver's way of driving is made. A part of the recommendation thereby needs outputting if the frequency of the change of operating mode is low, and a part of the recommendation needs outputting if the frequency of the change of operating mode is high. To this end, the frequencies or the frequency values of the changes of operating mode are each compared with a predetermined value, and are, on a case by case basis, i.e., depending on the kind of change of operating mode and the event of the comparison, i.e., the frequency is lower, the same or larger than the respective predetermined value, the recommendation is generated.

In an advantageous further development of the method a new user profile can be created or an existing user profile can be selected, wherein in the user profiles, the frequencies of the change of operating modes, which are respectively associated with the most recently active operating mode and/or the selected operating mode and the trigger that led to the change, are saved in a data field. A user profile is therefore, in particular, saved in the form of a matrix, wherein the columns of the matrix comprise the operating modes of the vehicle and the rows of the matrix comprise potential triggers, and the individual matrix values that characterize the frequency of the change of operating mode are initialized with a value of 0 when the matrix is generated. Furthermore, at least one matrix value is determined for every change of operating mode, the column of the matrix value corresponding to the most recently active operating mode and/or the selected operating mode, and the row of said matrix value corresponding to the trigger that led to the change of operating mode. The value(s) comprised by the matrix values have a value of 1 added to them.

By using user profiles, the way of driving with which the vehicle is controlled can be specifically assigned to a certain user. Generating and using several user profiles allows the behavior of people to be responded to individually if they share the vehicle. Defined target groups can thus be responded to, for example private individuals or the use of the vehicle as a hire car. An embodiment of the user profile as a matrix additionally constitutes a simple and appropriate implementation to track the frequency of the association of the trigger with the respective operating mode for the change of which it was responsible.

A further advantageous embodiment of the method provides that the message about the change of operating mode comprises at least one of the following elements:
  information about the currently selected operating mode;
  a reason why the current operating mode was selected; and/or
  a recommendation for energy efficient operation of a vehicle.

By comprising the mentioned elements of the message, a driver can be especially effectively referred to a certain way of driving, since the driver is referred to the connection between the reason for the change of operating mode and the effect on the energy consumption of the vehicle.

Based on a further advantageous embodiment of the method, the output of the message occurs visually, aurally, and/or haptically, wherein the at least one means of output comprised by the vehicle is formed as a display device and/or loudspeaker; and,
  if the output of the message occurs visually, the message comprises at least a graphic and/or a text; and
  if the output of the message occurs aurally, the message comprises at least a sound and/or a text; wherein the text is assembled from pre-made text modules or is generated by a text-to-speech system, with the help of a text-composer attachment. The outputting of a visual message makes it possible to also show graphics next to the output of an informative text, for example symbols or graphs to visualize information. Thereby, the understanding of the output message can in particular be improved. The outputting of an aural message further allows the driver to dedicate their attention to the traffic situation, since they do not need to look at a visual means of output to see the message, whereby general safety in road traffic can be increased, because the driver can dedicate more attention to looking where they are driving. Particularly advantageously, an aural and visual message are output simultaneously. In this way, the driver can, for example, hear the message, while another person present in the vehicle, for example a passenger, can receive the message visually and thereby, for example by seeing symbols or graphs, receive additional information. An assembly of the message from pre-made text modules constitutes a particularly simple and easily actionable approach in order to generate the message. Messages generated with the help of a text-composer attachment can, in particular, be designed to be more complex and more varied, whereby the driver can form a longer-lasting interest in the method.

An advantageous further development of the method provides that the output of the message can be activated and deactivated, wherein an independent deactivation of certain messages is learnt, in that a relationship is established between the deactivation of the output and the contents of the message. For example, with an activated Eco-Coach, the output of the message can be activated and deactivated by pressing a button and/or by a voice command, wherein the Eco-Coach is capable of learning and is trained to independently prevent the output of certain messages.

It can happen that the messages output with the help of the method are perceived as trivial or distracting by the driver, in particular if the driver has seen the same or a similar message several times. In this case, it is made particularly easily possible for the driver to prevent the output of the messages by pressing a button or by outputting a voice command. Comfort while using the method can be further increased, in that the Eco-Coach independently learns to suppress certain messages, according to the preferences of the driver. To this end, the Eco-Coach can, for example, also comprise artificial intelligence. In this case, a network of Eco-Coaches in different environmental conditions and with different users is continually programmed so that, after a learning phase, the Eco-Coach can anticipate a desired suppression depending on the user and implement it itself.

Based on a further advantageous embodiment of the method, the values currently present in the matrix elements can be reset, for example by pressing a delete button, or if a customer no longer agrees to data processing, in particular to the original initial value selected during the creation of the matrix.

The user profile can thereby be adaptively run, which leads to certain messages being able to be output again and again, by resetting the values of the matrix element. This is in particular advantageous if the vehicle is a hire car. Thus, the matrix can be reset for every change of driver, whereby every new driver gets the possibility to see a relevant message.

A further advantageous embodiment of the method provides that, depending on the user profile, the same predetermined value applies for every data field that characterizes a change of operating mode, or has one of the following individual values;
in particular:
  a fixed, predetermined value of 1;
  a fixed arbitrary predetermined value, which was predetermined by the vehicle manufacturer before delivering the vehicle;
  a variable predetermined value, wherein the value of the variable predetermined value can change with an arbitrary frequency, in particular by a transmission, from a vehicle-external central computer unit, to the vehicle, wherein the data transmission occurs in particular via an interface for wireless data transmission or an interface for cable-connected data transmission.

By using a first predetermined value depending on the user profile, the output of messages can be individually adjusted to different users. By selecting a fixed predetermined value of 1, it is ensured that a new user of the vehicle receives messages about certain ways of powering the vehicle, directly at the start of using the vehicle. It can, however, be sensible to analyze the behavior of a user over a longer period of time and only then to output messages, if a particular behavior occurs particularly often, for example a stop in cruising due to being too small a distance from the car driving ahead. In this case, the vehicle manufacturer can also set several fixed, arbitrary, predetermined values for each arbitrary data field, so that the output of a message for a certain trigger-dependent change of operating mode occurs several times, for example if the specific case is encountered five, twenty, and one hundred times. It is also possible for the predetermined value to be flexibly implemented, which means that, during the service life of the vehicle, it can be changed several times at arbitrary points in time. To change the now flexible predetermined value, the vehicle can receive data from an external central computer unit, in particular wirelessly or by cable, for example during a workshop visit.

Preferably, depending on the equipping of the vehicle and/or the typical load profile of the vehicle, one or more comparison vehicles are selected from an anonymized dataset that describes a fleet of vehicles and the frequency of the change of operating mode caused by the trigger is compared with the frequency of the change of operating mode of one or more comparison vehicles. The message addressed to the vehicle user comprises an analysis, that comprises the differences of the frequencies of the change of operating mode between the particular vehicle and the comparison vehicles.

This allows an effective analysis of the user behavior of the driver, in that, for example, the most efficient 10 percent of the vehicle fleet is selected as representative comparison vehicles, or an average value is created. The value based on the frequency of the changes of operating mode of these comparison vehicles is compared with the frequency saved in the user profile of the driver. Thus, similarities and differences can be determined with the analysis, with the help of which an especially effective recommendation is generated, which teaches and/or motivates the driver in an efficient way of driving. The driver is, in particular, shown what potential they still have compared to the representative comparison vehicles. The representative vehicles comprise vehicles of the same make, of the same type or at least vehicles with the same functionality, like for example a start-stop or cruising function. The kind of representative vehicles can be selected by the user or automatically designated. Additionally, a driver category can therefore be considered, for example age, efficient driver, or sporty driver. Preferably, the comparison occurs with a fleet of the same driving profiles, i.e., vehicles in, for example, city, countryside, or motorway traffic. Advantageously, the comparison only occurs locally, i.e., the ego vehicle is only compared with vehicles of a fleet that are driving along the same route or section of route. The comparison data are then preferably only collected for this route or section of route travelled on by ego and comparison vehicles.

Specifically, the predetermined values, which are compared with the frequencies of the change of operating mode of the driver, preferably in the user profile, can be manually and/or automatically adapted to the values identified by the vehicle fleet for the frequency of a change of operating mode.

An assistance system with a computer unit, preferably comprising the program Eco-Coach, at least one aural and/or visual means of output, a data connection between the computer unit, a drive controller, wherein the drive controller comprises an operating or driving strategy, sensors comprised by the vehicle and an operating system, is configured according to the invention to carry out a method for outputting recommendations for energy efficient operation of a vehicle. Moreover, the vehicle preferably comprises an interface for data transmission with a vehicle-external central computer unit.

A vehicle comprises at least one drive unit for powering the vehicle, wherein the drive unit comprises at least one internal combustion engine and/or at least one electric motor. According to the invention, the vehicle has an assistance system that is configured to carry out a method for outputting recommendations for energy efficient operation of a vehicle. Thus, the method carried out by the assistance system can be carried out in a vehicle that has a classic internal combustion engine, that has an electric motor or in a hybrid vehicle.

Further advantageous embodiments of the method according to the invention arise from the exemplary embodiment, which is described in more detail in the following, with reference to the figures.

BRIEF DESCRIPTION OF THE DRAWING FIGURES

Here.

DETAILED DESCRIPTION

Figure 1:
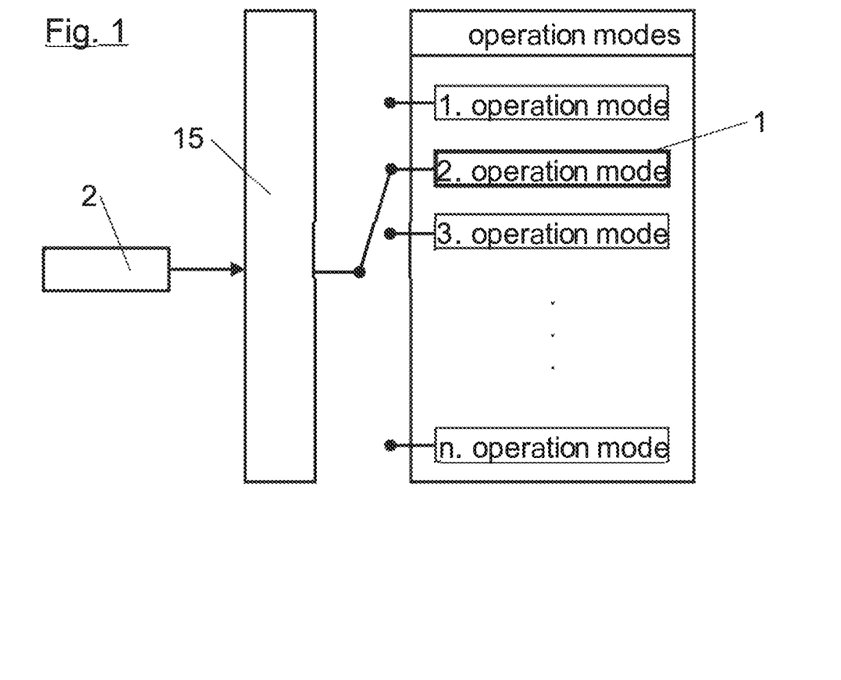
FIG. 1 shows a process for changing an operating mode, with which a vehicle is controlled.

A vehicle has at least two modes of operation, from which an operating mode 1 is respectively selected by a drive controller 15, depending on the occurrence of specified triggers 2 for operating the vehicle. The pre-defined operating modes, or operating strategies, can, for example, be at least one of the following categories: cruising, recuperation, turning off a motor with a stop/start system, load point shifting, battery charging, boosting, or an arbitrary further common operating strategy for a vehicle. The triggers recognized by the drive controller 15 can, for example, be a distance warning, an accelerator or brake pedal position, a temperature, for example an environmental temperature or oil temperature, or similar. If the vehicle comprises an internal combustion engine, then the drive controller is in particular executed as an engine controller. The following six examples serve as illustrations:

Example 1: a hybrid vehicle accelerates in an acceleration lane to go onto a motorway. In doing so, a driver strongly presses the accelerator pedal, whereby the drive controller changes to an operating mode in which an electric motor comprised by the hybrid vehicle supports an internal combustion engine also comprised by the hybrid vehicle during acceleration.

Example 2: a hybrid vehicle drives at a constant speed. The drive controller 15 thereby changes into an operating mode in which a load point shift is carried out in such a way that the internal combustion engine works in its most efficient range.

Example 3: an electric vehicle drives at a constant speed on a downhill road. In this case, an electric motor comprised by the electric vehicle consumes no electricity to retain the driving speed. This is referred to as cruising. In front of the electric vehicle, there is a further vehicle, which brakes, whereby a distance between the vehicles falls below a minimum distance, whereby the electric vehicle must brake. The drive controller 15 now changes the operating mode from "cruising" to "recuperation," in order to recover the energy lost in the braking process.

Example 4: a vehicle with an internal combustion engine is stood at traffic lights. Although the vehicle comprises an automatic start-stop system, the engine of the vehicle is not turned off, as an engine diagnosis program is currently running.

Example 5: short, repeated bursts of acceleration from customers who are not aiming for acceleration, but rather only to improve the fuel consumption.

Example 6: a vehicle with an internal combustion engine cruises, in that the internal combustion engine is disconnected from the drive train by means of a clutch and turned off. Due to too short a distance to the car in front or due to engaging the brake, the operating mode is changed and the cruising process is cancelled, the engine is started and fuel is wasted, which could have been saved by a more proactive way of driving.

These examples represent particular cases in which a certain trigger, i.e., driving conditions or a change in driving conditions, requires a certain operating mode or a change of operating mode. Building on this, an individual recommendation for intentional operation of the vehicle is generated with the help of the method. Later, corresponding recommendations for the examples named are listed.

Figure 2:
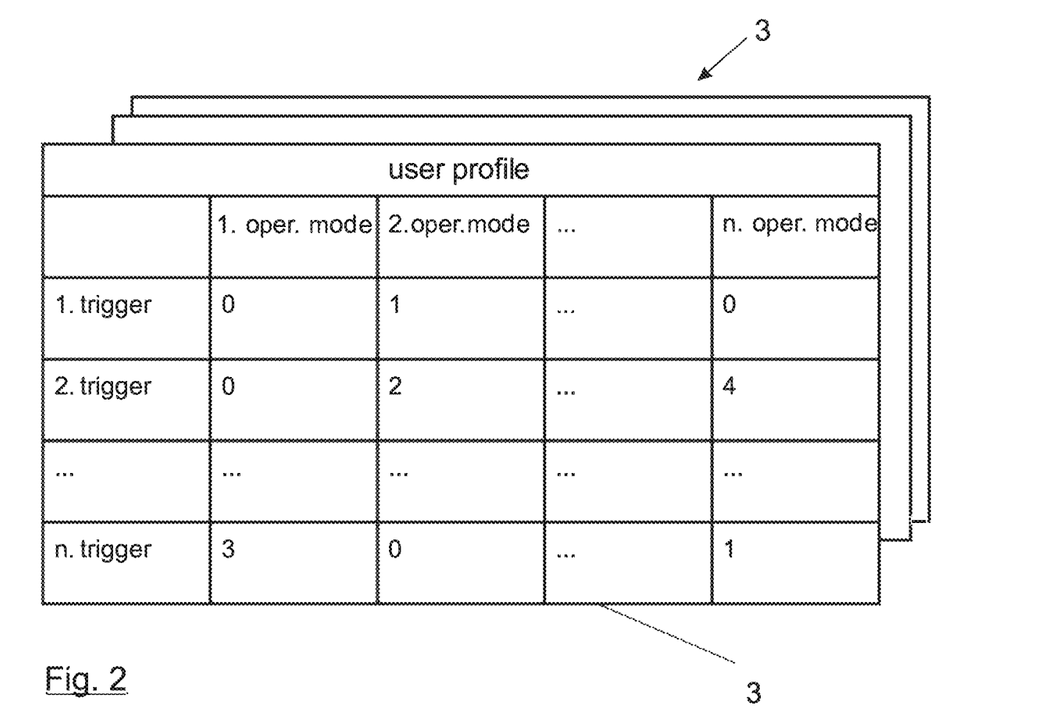
FIG. 2 shows user profiles in the form of matrices.

FIG. 2 shows a matrix 3 generated during the creation of a user profile. The frequencies of the changes of operating mode are shown in the matrix as matrix values. The columns of the matrix 3 comprise the operating modes, or operating strategies, comprised by the vehicle, wherein the rows of the matrix 3 comprise the pre-defined triggers for changing the operating mode, such as, for example, brake application, accelerator release, tailgating. When creating a new user profile, the individual matrix values, each characterizing a frequency of the change of operating mode, are filled with a value of 0. If a trigger value is met due to driving conditions or driving behavior of a driver, i.e., for example exceeding or falling below, this is detected by the drive controller 15, whereby the operating mode is changed. Thereafter, a matrix element is determined in which the corresponding row that comprises the occurring trigger, as well as the corresponding column of the matrix, that comprises the operating mode that was ended or that was changed to, is selected. The matrix value comprised by this matrix element is added to a value of 1. With advancing operating time of the vehicle, the matrix values counting the changes of operating mode thus increase. It is therefore possible that these permanently increase, or can be reset to their original value by a specific event. This can, for example, be a user instruction, a specified period of time during which the engine is turned off, a change of the user profile, or receiving a data stream transmitted by a vehicle-external central computer unit. Generally, it is possible to carry out a reset of the matrix values via an arbitrary further event not defined in detail and/or to reduce them via "fading" the matrix values gradually over time, until they correspond to their respective initial value, wherein the fading can be interrupted, for example by a renewed increase of the matrix value.

Figure 3:
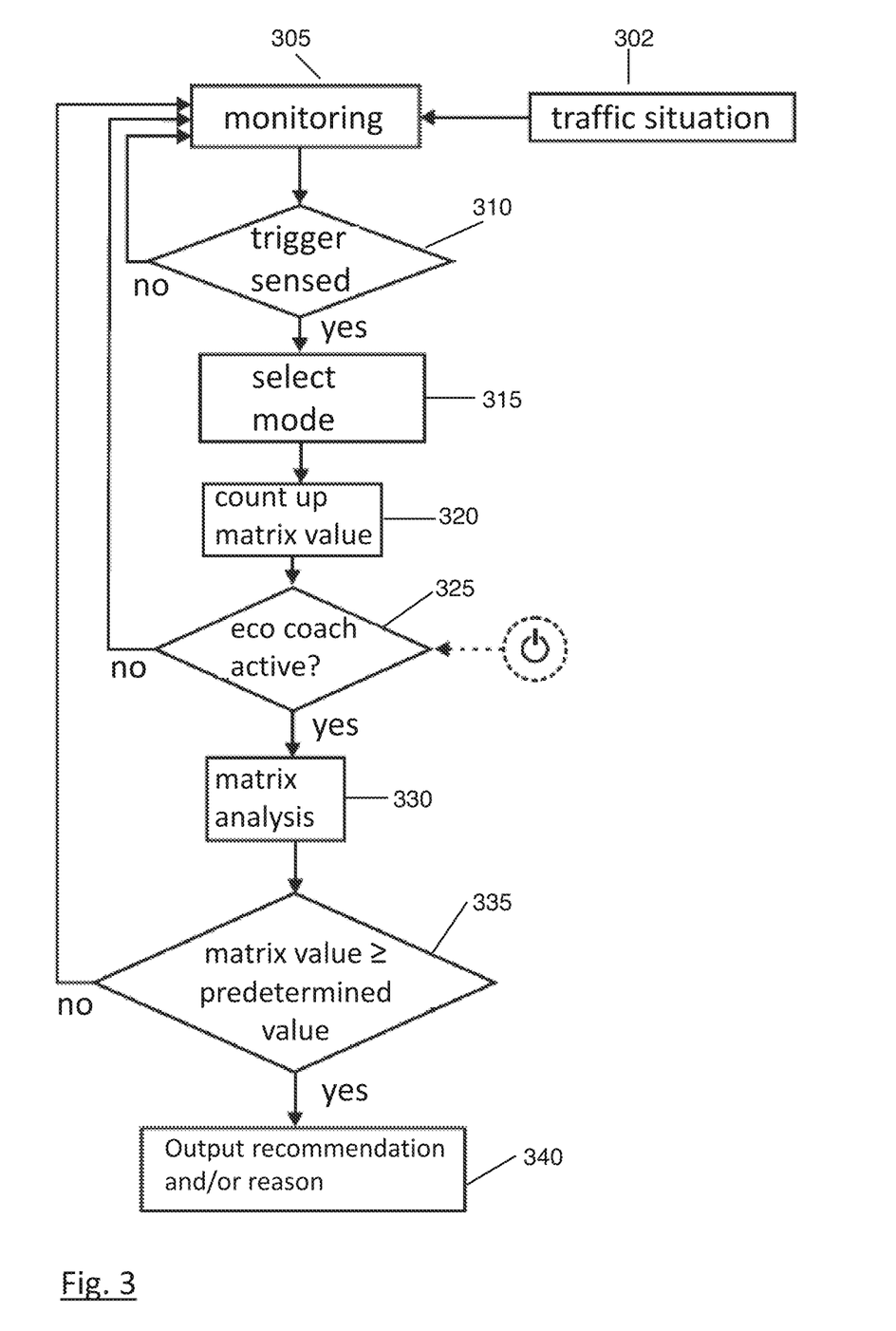
FIG. 3 shows a flowchart of a method for outputting recommendations for energy efficient operation of a vehicle.

In the flow chart shown in FIG. 3, a vehicle permanently analyzes the current or immediate traffic conditions (302), in which events or triggers are sensed by a monitoring of the driving strategy or drive controller 15, whereby the drive controller 15 changes the operating mode of the vehicle (step 305). If the drive controller 15 detects no trigger, i.e., no trigger value is met, it continues to carry out the monitoring ("No" path out of step 310). If a change of operating mode took place after meeting a trigger value, a trigger is sensed and a corresponding matrix value is counted up ("Yes" path out of step 310, step 315, and step 320). In the case that an Eco-Coach, which is a program comprised by a computer unit 5, comprised by the vehicle is switched on, an analysis of the matrix takes place ("Yes" path out of step 325). Every matrix value with a predetermined value applicable to the relevant matrix element, i.e., for the change of operating mode in question, is compared and in the case that the current matrix value exceeds the relevant predetermined value, the output of a message to the driver occurs, which a recommendation for energy efficient operation of the vehicle, information about the currently selected operating mode and/or a reason why the current operating mode was selected or a change of operating mode took place ("Yes" path out of step 330 and step 340). If the Eco-Coach is not active, it can be turned on by a button and/or a voice command ("No" path out of step 325).

Figure 4:
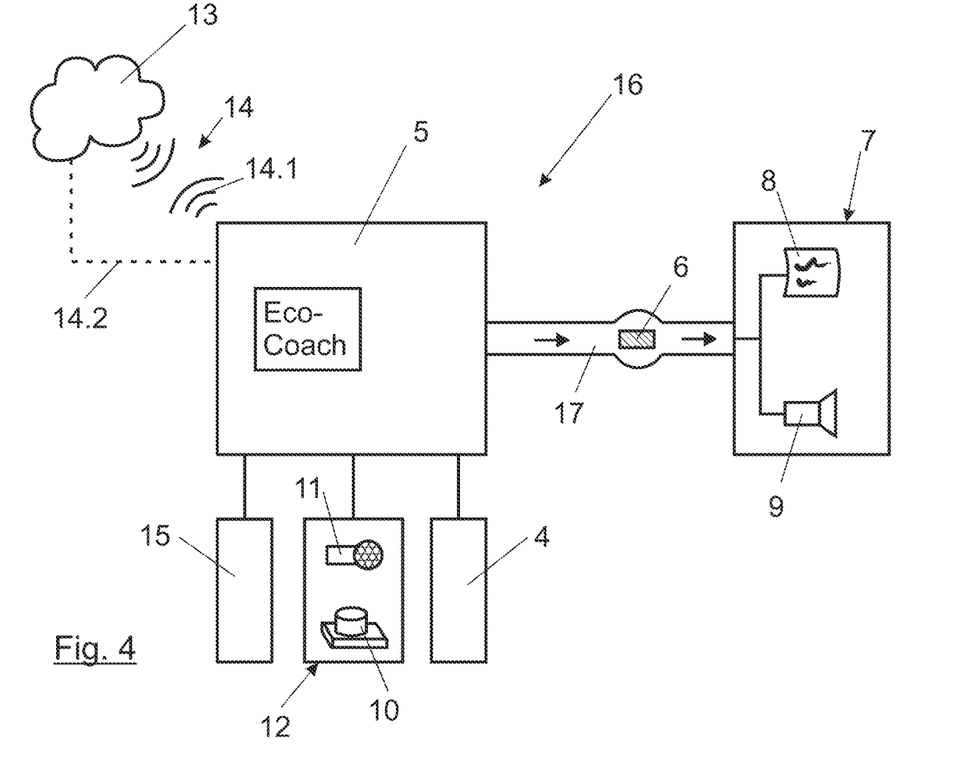
FIG. 4 shows an assistance system for carrying out the method.

An assistance system 16 shown in FIG. 4 has the computer unit 5 that comprises the program with the name Eco-Coach. Eco-Coach serves, as already mentioned, to analyze the matrix that comprises the user profile with the respective frequencies of the change of operating mode. The computer unit 5 has an interface for data transmission 14, using which data can be exchanged with a vehicle-external central computer unit 13. The interface is thereby, in particular, configured as an interface for wireless data transmission 14.1 or an interface for cable-connected data transmission 14.2. Furthermore, the computer unit 5 has a data connection with the drive controller 15, an operating system 12 and sensors 4 that are comprised by the vehicle. The operating system 12 in turn comprises at least one microphone 11 for detecting voice commands as well as at least one button 10, which can be arranged as a physical button anywhere in the vehicle, or can be comprised as a virtual button of a display device of the vehicle, for example an instrument panel or a head unit. The Eco-Coach can be turned on and off using the button 10 and/or the microphone 11. Furthermore, the computer unit 5 has a data connection, for example in the form of a data bus 17, with which messages 6 generated by the computer unit 5 are forwarded to a means of output 7 comprised by the vehicle. The messages 6 in particular comprise a text that was either assembled from text modules or was generated with the help of a text composer attachment. Furthermore, the message 6 optionally has further information. The message 6 is then communicated visually on a display device 8 and/or aurally with the help of a loudspeaker 9. The aural communication can thereby occur with the help of a text-to-speech system. Referring back to the four examples already introduced, the message could read as follows:

Example 1: "During this motorway entrance, the E-engine was able to provide support so that despite the strong acceleration, little fuel was wasted." Additionally, a graphic, for example a consumption and charge curve, can be shown on a visual means of output.

Example 2: "By means of a load point shift, in this situation energy is now being saved at the same speed, since the engine is working in its most efficient range."

Example 3: "The cruising in this situation was somewhat disadvantageous, since already after a short time, the car in front appeared on the radar, and braking was necessary, in order to maintain the safety distance. However, the energy largely went back into the battery due to recuperation."

Example 4: "Despite accelerator release, the engine could not be switched off here, as an engine diagnosis program is currently running."

Example 5: "Extremely short bursts of acceleration do not lead to acceleration, but can noticeably improve fuel consumption."

Example 6: "By keeping a greater distance and avoiding engaging the brake, the distance of the cruising segment can be increased and fuel is saved."

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method performed by an assistance system for outputting recommendations for energy efficient operation of a vehicle with the assistance system and having at least two operating modes, from which an operating mode is respectively selected by a drive controller of the assistance system, depending on specified triggers, for operating the vehicle, the method comprising:
   receiving, by the drive controller, values measured by sensors of the vehicle;
   comparing, by the drive controller, at least one of the values measured by one of the sensors of the vehicle to at least one trigger value;
   determining, by the drive controller based on the comparison of the at least one of the values measured by one of the sensors of the vehicle to the at least one trigger value, that a current operating mode of the vehicle should be changed;
   changing, by the drive controller responsive to a determination that the current operating mode of the vehicle should be changed, an operating mode of the vehicle from the current operating mode to a second operating mode, wherein the current operating mode and the second operating mode are part of the at least two operating modes;
   incrementing, by a computer unit, a frequency of the change of operating mode at every determination of the change of the operating mode caused by the trigger;
   analyzing, by the computer unit, the frequency of change of the operating mode by comparing the frequency of the change of operating mode with a predetermined value;
   generating, by the computer unit depending on a result of the comparison, a message about the change of the operating mode; and
   outputting the message via at least one output comprised by the vehicle,
   wherein, in a user profile, the frequency of the change of the operating mode associated with a most recently active operating mode or the selected operating mode and the trigger that led to the change of the operating mode is saved in a data field.

2. The method of claim 1, wherein the message about the change of the operating mode comprises at least one of the following elements:
   information about a currently selected operating mode;
   a reason why the current operating mode was selected; or
   a recommendation for energy efficient operation of the vehicle.

3. The method of claim 1, wherein
   the output of the message occurs visually, aurally, or haptically, wherein the at least one output comprised by the vehicle is a display device, loudspeaker or steering wheel,
   if the output of the message occurs visually, the message comprises at least a graphic or a text,
   if the output of the message occurs aurally, the message comprises at least a sound or a text, and
   the text is assembled from pre-made text modules or is generated by a text-to-speech system, with assistance of a text-composer attachment.

4. The method of claim 1, wherein the output of the message is activatable and deactivatable, wherein an independent deactivation of certain messages is learned, and wherein a relationship is established between the deactivation of the output and contents of the message.

5. The method of claim 1, wherein values present in the user profile are resettable.

6. The method of claim 1, wherein
   depending on the user profile, every data field has a same predetermined value or has one of the following individual predetermined values
   a fixed predetermined value of 1,
   a fixed arbitrary predetermined value, which was predetermined by a vehicle manufacturer before delivering the vehicle, and
   a variable predetermined value, and
   a value of the variable predetermined value is changeable with an arbitrary frequency by a transmission from a vehicle-external central computer unit to the vehicle,
   the data transmission occurs via an interface for wireless data transmission or an interface for cable-connected data transmission.

7. The method of claim 1, wherein
depending on equipping of the vehicle or a typical load profile of the vehicle, one or more comparison vehicles are selected from an anonymized dataset that describes a fleet of vehicles, and
the frequency of the change of the operating mode caused by the trigger is compared with a frequency of change of operating mode of the one or more comparison vehicles, and
the message generated comprises an analysis comprising differences of the frequencies of the change of the operating mode between the particular vehicle and the one or more comparison vehicles.

8. An assistance system for a vehicle, the assistance system comprising:
a computer unit;
at least one aural or visual output;
a data connection between the computer unit, a drive controller, sensors comprised by the vehicle and an operating system,
wherein the assistance system is configured to output recommendations for energy efficient operation of a vehicle having at least two operating modes, from which an operating mode is respectively selected by the drive controller, depending on specified triggers, for operating the vehicle, by
receiving, by the drive controller, values measured by sensors of the vehicle;
comparing, by the drive controller, at least one of the values measured by one of the sensors of the vehicle to at least one trigger value;
determining, by the drive controller based on the comparison of the at least one of the values measured by one of the sensors of the vehicle to the at least one trigger value, that a current operating mode of the vehicle should be changed;
changing, by the drive controller responsive to a determination that the current operating mode of the vehicle should be changed, an operating mode of the vehicle from the current operating mode to a second operating mode, wherein the current operating mode and the second operating mode are part of the at least two operating modes;
incrementing, by the computer unit, a frequency of the change of operating mode at every determination of the change of the operating mode caused by the trigger;
analyzing, by the computer unit, the frequency of change of the operating mode by comparing the frequency of the change of operating mode with a predetermined value;
generating, by the computer unit, depending on a result of the comparison, a message about the change of the operating mode; and
outputting the message via the at least one at least one aural or visual output,
wherein, in a user profile, the frequency of the change of the operating mode associated with a most recently active operating mode or the selected operating mode and the trigger that led to the change of the operating mode is saved in a data field.

9. A vehicle, comprising:
a drive unit configured to power the vehicle, wherein the drive unit comprises at least one internal combustion engine or at least one electric motor; and
an assistance system, comprising:
a computer unit;
at least one aural or visual output;
a data connection between the computer unit, a drive controller, sensors comprised by the vehicle and an operating system,
wherein the assistance system is configured to output recommendations for energy efficient operation of the vehicle having at least two operating modes, from which an operating mode is respectively selected by the drive controller, depending on specified triggers, for operating the vehicle, by
receiving, by the drive controller, values measured by sensors of the vehicle;
comparing, by the drive controller, at least one of the values measured by one of the sensors of the vehicle to at least one trigger value;
determining, by the drive controller based on the comparison of the at least one of the values measured by one of the sensors of the vehicle to the at least one trigger value, that a current operating mode of the vehicle should be changed;
changing, by the drive controller responsive to a determination that the current operating mode of the vehicle should be changed, an operating mode of the vehicle from the current operating mode to a second operating mode, wherein the current operating mode and the second operating mode are part of the at least two operating modes;
incrementing, by the computer unit, a frequency of the change of operating mode at every determination of the change of the operating mode caused by the trigger;
analyzing, by the computer unit, the frequency of change of the operating mode by comparing the frequency of the change of operating mode with a predetermined value;
generating, by the computer unit depending on a result of the comparison, a message about the change of the operating mode; and
outputting the message via the at least one aural or visual output,
wherein, in a user profile, the frequency of the change of the operating mode associated with a most recently active operating mode or the selected operating mode and the trigger that led to the change of the operating mode is saved in a data field.

* * * * *